United States Patent [19]

Mollard et al.

[11] 4,022,874

[45] May 10, 1977

[54] PROCESS FOR THE PRODUCTION OF SODIUM PERCARBONATE

[75] Inventors: Paul Mollard, Sainte Foy les Lyon; Louis Mesaros, Oullins, both of France

[73] Assignee: Produits Chimiques Ugine Kuhlmann, Paris, France

[22] Filed: July 11, 1974

[21] Appl. No.: 487,613

[30] Foreign Application Priority Data

July 20, 1973 France .............................. 73.26674

[52] U.S. Cl. ............................................ 423/415 P
[51] Int. Cl.$^2$ ...................................... C01B 15/10
[58] Field of Search ................ 423/415, 415 P, 427

[56] References Cited

UNITED STATES PATENTS

| | | | |
|---|---|---|---|
| 2,986,448 | 5/1961 | Gates et al. | 423/415 P |
| 3,463,618 | 8/1969 | Harris et al. | 423/415 P |
| 3,860,694 | 1/1975 | Jayawant | 423/415 P |
| 3,864,454 | 2/1975 | Pistor et al. | 423/415 P |

*Primary Examiner*—Earl C. Thomas
*Attorney, Agent, or Firm*—Brooks Haidt Haffner & Delahunty

[57] ABSTRACT

Processes for the preparation of sodium percarbonate having substantially the formula $2Na_2CO_3 \cdot 3H_2O_2$, the processes being particularly suited to the use of ordinary sodium carbonate, which processes comprise reacting 60 to 80 percent hydrogen peroxide with sodium carbonate monohydrate or a hydrate of sodium carbonate containing from about 75 to 90 percent sodium carbonate; and products obtained thereby, particularly those percarbonate products having an excellent resistance to shock and attrition and effective densities of 0.61–0.92 g/cm$^3$ and mean particle diameters of 250–610 microns.

5 Claims, No Drawings

PROCESS FOR THE PRODUCTION OF SODIUM PERCARBONATE

BACKGROUND OF THE INVENTION

The present invention relates to processes for the preparation of sodium percarbonate and more particularly to the preparation of such percarbonates substantially responding to the formula $2Na_2CO_3 \cdot 3H_2O_2$ through the use of certain hydrates of sodium carbonate and certain hydrogen peroxide strengths.

A number of processes for the preparation of sodium percarbonate have already been proposed. Among these is the procedure of Schlotterbeck described in German Patent No. 560,460. This process utilizes as feed materials 30 percent hydrogen peroxide and sodium carbonate monohydrate to provide sodium percarbonates having the formula $(Na_2CO_3 \cdot H_2O)_x \cdot (H_2O_2)_y$. This procedure necessitates refrigeration of the reaction mixture to maintain a temperature below 5° C. The process of Kali Chemie described in Belgian Patent No. 446,540 utilizes sodium carbonate decahydrate and 40 percent hydrogen peroxide as starting materials and is carried out in the presence of magnesium salts, sodium silicate and common salt.

The Henkel process shown in French Patent No. 1.171,464 provides a sodium percarbonate containing water of crystallization and utilizes an inert organic dilution agent. The Solvay process described in French Patent No. 2,076,430 uses 20 percent hydrogen peroxide and sodium carbonate feed materials in an aqueous medium in the presence of seed particles. The reaction is carried out in a fluidized bed at a temperature in the neighborhood of 50° C with air blown into the apparatus at a temperature of at least 110° C. The sodium percarbonate so obtained has the nominal formula $2Na_2CO_3 \cdot 3H_2O_2$, but its active oxygen content does not exceed 14.8 percent.

The Laporte process described in French Patent No. 2,098,191 consumes anhydrous sodium carbonate which is fluidized with air, and is carried out in the presence of 65 percent hydrogen peroxide. The required reaction time of this process is very long, It is noted that the Examples in the Laporte patent utilize overall reaction and drying times of 13 hours 10 minutes, 6 hours 45 minutes, 4 hours, and 1 hour and 20 minutes. The temperature of the fluidizing gas is maintained at 55°–70° C.

The foregoing processes present a number of disadvantages. The Schlotterbeck process necessitates considerable refrigeration of the reaction mixture and does not provide a sodium percarbonate without water of crystallization. The Kali Chemie process involves the use of numerous additives, while the Henkel process necessitates the use of an organic diluent and only produces hydrated sodium percarbonate. The Solvay process is awkward to carry out in practice because it requires the use of a reaction temperature considerably higher than ambient, while the Laporte process requires the reaction and drying times to be very long and by the same token requires that the anhydrous carbonate starting material be very finely divided. Moreover, the percarbonate obtained by the Laporte process cannot satisfy the actual requirements for manufacture of lixivia.

THE INVENTION

The present invention provides a straightforward and effective procedure which does not have the disadvantages of the prior art and which leads to a sodium percarbonate free from water of crystallization. The product of the invention furthermore has good resistance to attrition and its apparent, or bulk, density and mean particle diameter can be adjusted as a function of the carbonate starting material.

While it is extremely difficult to utilize 60–80 percent strength peroxide and anhydrous sodium carbonate to obtain percarbonte, it has surprisingly been found according to the present invention that percarbonate production becomes very easy utilizing the monohydrate of the carbonate or hydrated carbonate containing 75 to 90 percent by weight of $Na_2CO_3$. The present invention accordingly comprises a procedure for the preparation of sodium percarbonate responding substantially to the empirical formula $2Na_2CO_3 \cdot 3H_2O_2$ by action of aqueous hydrogen peroxides, containing between 60 percent and 80 percent hydrogen peroxide, on sodium carbonate, the sodium carbonate employed being either the monohydrate, $Na_2CO_3 \cdot H_2O$, or hydrated sodium carbonates containing between 75 and 90 percent of sodium carbonate, $Na_2CO_3$. All parts, percentages, proportions and ratios herein are by weight, unless otherwise indicated.

Thus, although hydrogen peroxide having the foregoing strength is used in the stoichiometric mixture, a substitution of the monohydrate for the anhydrous carbonate provides the following unexpectedly superior results:

With anhydrous carbonate the mixture obtained in 1 hour at ambient temperature is a very "watery" paste which has a tendency to overheat and lose its active oxygen content, whereas with the monohydrated carbonate starting material the mixture obtained under the same conditions is comprised of non-sticky particles which dry very easily without loss of active oxygen. It has further been found that if the anhydrous carbonate is preliminarily hydrated, equally good results are obtained as those with the monohydrated carbonate. The use of anhydrous carbonate coupled with the introduction of the quantity of water corresponding to the water of crystallization into the peroxide, that is to say by dilution of the peroxide, leads to even poorer results than obtained with the anhydrous carbonate and undiluted hydrogen peroxide.

For convenience herein, the term 60 percent or 80 percent hydrogen peroxide will be used to mean, respectively, an aqueous peroxide which contains 60 percent or 80 percent $H_2O_2$. Commercially available peroxides of this titer are found to be satisfactory in carrying out the present invention.

The reaction of the present invention can be carried out at ordinary ambient temperatures on the order of 15° to 30° C in an apparatus permitting adequate mixing and contacting of the reaction constituents, for example, in a kneader or, advantageously, in a fluidized bed. The reaction time can vary over a range and is desirably between about 15 minutes and 1.5 hours. It happens that the percarbonate removed from the reaction apparatus also contains a certain quantity of moisture, but this is nevertheless not troublesome because a simple drying in ambient air provides a final product substantially free of water.

The sodium percarbonate prepared according to the present invention has an active oxygen content which can exceed 15.3 percent. It has excellent resistance to shocks and attrition. As has been already mentioned above, it is possible within limits to adjust the bulk density and the mean particle diameter of the percarbonate by varying the characteristics of the starting carbonate.

Starting for example with sodium carbonate having a bulk density between 0.450 an 0.750 g/cm³ and a mean particle diameter, $\phi_m$, between 200 and 450 microns, sodium percarbonate having an apparent density between 0.610 and 0.920 g/cm³ and a mean diameter between 250 and 610 microns can be prepared. These bulk density and mean diameter characteristics of the carbonate starting material and of the percarbonate obtained vary in the same sense, all other conditions being equal; that is, a high density carbonate monohydrate will provide a higher density percarbonate product.

Another advantage of the present invention lies in the fact that the sodium carbonate starting material does not need to be highly pure and in fact can be fairly impure. It can, for example, contain a quantity of sodium sulfate on the order of 14 percent without the latter affecting appreciably the physical characteristics, that is, the granulometry (or particle size distribution), apparent density, or resistance to shock and attrition of the final product.

The ratio of carbonate and peroxide can be varied, and it is preferred to employ the hydrogen peroxide and sodium carbonate in approximately stoichiometric proportions. In a case where the sodium carbonate starting material fixes or holds the hydrogen peroxide less easily, it is desirable to reduce the proportion of the latter, for example by 5 percent.

The following examples are given to illustrate embodients of the invention as it is presently preferred to practice it. It will be understood that these examples are illustrative, and the invention is not to be considered as restricted thereto except as indicated in the appended claims.

EXAMPLE I

A 100 mm diameter fluidization reactor is charged with 150 g of sodium carbonate monohydrate obtained by crystallization from an aqueous solution and having a bulk density of 0.620 g/cm³, a mean diameter of 340 microns, and a sodium carbonate content of 83.4 percent. Seventy milliliters of a 67.1 percent hydrogen peroxide is introduced drop-by-drop into the reactor during 97 minutes.

This produces 183 g of sodium percarbonate containing 15.1 percent of active oxygen and less than 1 percent of water. Its bulk density is 0.724 g/cm³ and its mean diameter is 250 microns. Based upon the hydrogen peroxide, the yield is 97.3 percent.

EXAMPLE II

A laboratory kneader is charged with 500 g of sodium carbonate monohydrate identical to that used in Example I, and 246 ml of 63.6 percent hydrogen peroxide is introduced at two opposite points in the bowl of the mixer during 60 minutes. The surface of the reaction mass is continuously swept with 60 liters/minute of air at 20° C injected through the preferred rim on the mixer bowl. The temperature does not rise above 20° C.

The product removed from the kneader consists of moist grains, but these disperse or crumble very easily and contain less than 10 percent moisture. The product is easily dried by simply spreading it out on a glass plate swept with ambient air. The 620 g of sodium percarbonate product so obtained contains 66.70 percent $Na_2CO_3$ and 32.13 percent $H_2O_2$ (an active oxygen content of 15.12 percent). The product's physical characteristics show a bulk density of 0.733 g/cm³ and a mean diameter of 540 microns. Less than 1.3 percent of the particles are smaller than 74 microns and 21.3 percent of the particles are larger than 710 microns.

The proportion of fines, that is particles less than 53 microns in effective diameter, produced by attrition during pneumatic transfer is 1.5 percent. The yield based on $H_2O_2$ is 99.2 percent.

EXAMPLE III

Sodium carbonate monohydrate is prepared by carbonating an aqueous washing soda with combustion gas from residual fuel which is not purged of $SO_2$. The mother liquor so obtained contains 30 g/liter of sodium sulfate. The starting carbonate accordingly has a bulk density of 0.720 g/cm³ and a mean diameter of 550 microns.

This starting material is treated according to the procedure of Example II utilizing the same quantities of sodium carbonate and hydrogen peroxide of the same strength. The time of the reaction is 60 minutes.

The sodium percarbonate product obtained contains 65.6 percent $Na_2CO_3$ and 30.8 percent $H_2O_2$, an active oxygen content of 14.5 percent. The physical characteristics of the product are a bulk density of 0.783 g/cm³ and a means particle diameter of 520 microns. Based on $H_2O_2$, the yield is 98 percent.

EXAMPLE IV

A sodium carbonate is prepared by utilizing the same sort of mother liquor as in Example III in which the sodium sulfate concentration is intentionally allowed to increase to the point where a precipitate is formed comprising $2Na_2SO_4.Na_2CO_3$ and $Na_2CO_3.H_2O$. This sodium carbonate monohydrate contains 13.8 percent of $Na_2SO_4$ and 74.6 percent of $Na_2CO_3$. The physical characteristics of this material show a bulk density of 0.610 g/cm³ and a mean diameter of 610 microns.

This carbonate is treated with hydrogen peroxide under identical conditions to those described in Example II. The sodium percarbonate product obtained contains 13.1 percent active oxygen and has a bulk density of 0.765 g/cm³ and a mean diameter of 410 microns. Based upon $H_2O_2$, the yield is 97.9 percent.

EXAMPLE V

Various sodium carbonates are prepared by crystallization from an aqueous solution at different agitation speeds during the precipitation. The agitation speed is reduced to 50 percent and then doubled. The sodium carbonates so obtained have variable physical characteristics, namely bulk densities of 0.522 to 0.811 g/cm³ and mean diameters from 330 to 520 microns. Hydrogen peroxide is fixed in the sodium carbonate during 60 minutes by a kneading as in Example II.

The sodium percarbonate obtained has 15 percent active oxygen with a yield, based on $H_2O_2$, greater than 96 percent in all these cases. The physical characteristics of the sodium percarbonates obtained vary between 0.671 and 0.804 g/cm³ in bulk density, and from 250 to 510 microns in mean diameter.

EXAMPLE VI

A monohydrated sodium carbonate is prepared by the addition of water to anhydrous sodium carbonate having a very high density (1.09 g/cm³) and a mean diameter of 335 microns in a mixer. There is introduced into the same apparatus during 60 minutes 70 percent hydrogen peroxide in a quantity 5 percent less than stoichiometric.

The sodium percarbonate product has an active oxygen content of 13.9 percent, a bulk density of 0.920 g/cm³, and a mean diameter of 410 microns. The yield is 95.6 percent based on hydrogen peroxide.

The percarbonates prepared according to the present invention are suited to a wide variety of uses.

What is claimed is:

1. A process for the preparation of sodium percarbonate responding substantially to the formula $2Na_2CO_3.3H_2O_2$ which process comprises reacting hydrogen peroxide having a peroxide strength between about 60 percent and 80 percent with solid crystalline sodium carbonate, the carbonate being the monohydrate or a hydrate containing from 75 to 90 percent $Na_2CO_3$, to obtain the percarbonate, the reaction being carried out in the absence of an inert organic medium.

2. A process according to claim 1 wherein the carbonate has a bulk density between 0.450 and 0.750 g/cm³ and a mean diameter between 200 and 450 microns.

3. A process according to claim 1 wherein the quantities of peroxide and carbonate are approximately stoichiometric.

4. A process according to claim 1 wherein the reaction time is from 15 minutes to 1.5 hours.

5. A process according to claim 1 carried out at ambient temperature.

* * * * *